US 11,794,851 B2

(12) United States Patent
Marui

(10) Patent No.: US 11,794,851 B2
(45) Date of Patent: Oct. 24, 2023

(54) SPACERS FOR ADJUSTING TREADS OF BICYCLE PEDALS

(71) Applicant: Shinji Marui, Kobe (JP)

(72) Inventor: Shinji Marui, Kobe (JP)

( * ) Notice: Subject to any disclaimer, the term of this patent is extended or adjusted under 35 U.S.C. 154(b) by 0 days.

(21) Appl. No.: 18/051,133

(22) Filed: Oct. 31, 2022

(65) Prior Publication Data

US 2023/0142490 A1 May 11, 2023

(30) Foreign Application Priority Data

Nov. 10, 2021 (JP) .................................. 2021-183762

(51) Int. Cl.
*B62M 3/08* (2006.01)

(52) U.S. Cl.
CPC .................................. *B62M 3/086* (2013.01)

(58) Field of Classification Search
CPC .......... B62M 3/086; B62M 3/08; F16C 23/04; F16C 33/1025; F16C 35/063
USPC ....................................................... 74/594.4
See application file for complete search history.

(56) References Cited

U.S. PATENT DOCUMENTS

| 11,565,768 | B1* | 1/2023 | Gu ........................ | B62M 3/086 |
| 2009/0078081 | A1* | 3/2009 | French .................... | B62M 3/08 |
| | | | | 74/594.4 |
| 2009/0095122 | A1* | 4/2009 | Weagle .................... | B62M 3/08 |
| | | | | 74/560 |
| 2010/0186547 | A1* | 7/2010 | Linden .................... | B62M 3/08 |
| | | | | 74/594.4 |
| 2016/0059927 | A1* | 3/2016 | Bryne ..................... | B62M 3/086 |
| | | | | 74/594.6 |
| 2022/0106009 | A1* | 4/2022 | Inoue ...................... | B62M 3/08 |

FOREIGN PATENT DOCUMENTS

| CN | 201604741 | U | * | 10/2010 | ............. | B62M 3/08 |
| CN | 102700677 | A | * | 6/2012 | ............. | B62M 3/08 |
| CN | 206579785 | U | * | 10/2017 | ............. | B62M 3/08 |
| EP | 2610158 | A1 | * | 7/2013 | ............. | B62M 3/08 |
| GB | 2536444 | A | * | 9/2016 | ............. | B62M 3/08 |

(Continued)

OTHER PUBLICATIONS

Machine translation of WO 2019224312A1, Kutluca, Nov. 28, 2019 (Year: 2019).*

(Continued)

*Primary Examiner* — Vinh Luong
(74) *Attorney, Agent, or Firm* — INNOVATION CAPITAL LAW GROUP, LLP; Vic Lin

(57) ABSTRACT

A spacer is provided for adjusting the tread of a bicycle pedal. The sole can fit to its tread force receiving surface without causing damage to a user's foot or shoe. The non-slipping effect is high. A spacer is detachable from the main body of a bicycle pedal and includes an elastic material for adjusting a height from a deck surface and, when tread force is applied to the elastic material, is pushed down in the direction of thickness according to the tread force, and the tip of a stud pin attached to the main body of the pedal is exposed more from the spacer. The detachable spacer can cover and protect a large portion of the exposed part of the stud pin when no foot is placed on the pedal, and when a foot is placed on the pedal, a stud pin protrudes to provide the non-slipping effect.

14 Claims, 12 Drawing Sheets

(56) References Cited

FOREIGN PATENT DOCUMENTS

| JP | S57133488 U | 8/1982 | | |
|---|---|---|---|---|
| JP | S5922088 U | 2/1984 | | |
| JP | 2010162964 A | 7/2010 | | |
| WO | WO 2016013865 A1 * | 1/2016 | ............. | B62M 3/08 |
| WO | WO 2017106336 A1 * | 6/2017 | ............. | B62M 3/12 |
| WO | WO 2019224312 A1 * | 11/2019 | ............ | B62M 3/086 |

OTHER PUBLICATIONS

Machine translation of CN 206579785U, Huang, Oct. 24, 2017 (Year: 2017).*
Machine translation of CN 102700677A, Chen, Mar. 10, 2012 (Year: 2012).*
Machine translation of CN 201604741U, Chen, Oct. 13, 2010 (Year: 2010).*
Does thermoplastic include foam?, Microsoft Bing, Apr. 4, 2023 (Year: 2023).*
Is thermoplastic elastic? Microsoft Bing, Apr. 4, 2023 (Year: 2023).*
Is polycarbonate elastic?, Microsoft Bing, Apr. 4, 2023 (Year: 2023).*
7 Properties of Nylon: Everything you Need to Know, Team Xometry, Jun. 23, 2022 (Year: 2022).*
Foam compass, Foam Materials: Polyethylene, Polyurethane, Polystyrene, trocellen.com/foam-materials/, Apr. 10, 2021 (Year: 2021).*
Compression Loading—data, http://www.researchgate.net/publication/317294145/, Jan. 2014 (Year: 2014).*
Translation of WO 2016013865 A1, Lee et al., Jan. 28, 2016 (Year: 2016).*

* cited by examiner

SPACERS FOR ADJUSTING TREADS OF BICYCLE PEDALS

TECHNICAL FIELD

The present invention relates to a spacer for adjusting the tread of a bicycle pedal, which is provided with a detachable spacer for adjusting height such that the deck surface (tread surface) can go along with the sole.

BACKGROUND OF THE INVENTION

Some bicycle pedals can be adjusted using a detachable spacer so that the deck surface can go along with the sole. In general, the detachable spacer is made of the same material as that of the main body of the pedal and has no elasticity nor can be deformed. This is because it is believed that power for stepping on a bicycle pedal dissipates and the driving force is lost when the tread force receiving surface of a bicycle pedal is deformed, for the driving force is generated by the leg strength of a user. Accordingly, a spacer for adjusting height from the deck surface is not generally made of an elastic material.

A cant adjustment mechanism has been known for bicycle pedals as a technology for adjusting an angle of a tread by providing a spacer (see Patent Document 1). This technology can make cant adjustment possible by fixing a spacer to a pedal, which is provided with angles on both the upper surface and the lower surface. However, although the spacer of Patent Document 1 is adjustable for angles, the problem is that it uses no elastic material so that non-slipping effect cannot be achieved.

As a technology for attaching a spacer made of an elastic material to a bicycle pedal, a bicycle pedal cover provided with an elastic material at a portion of a pedal that comes into contact with the heel of a shoe has been known (see Patent Document 2). This can be used without causing any damage to the heel by covering the surrounding of the pedal with a soft material having elasticity even when a user wears high heel shoes. However, since the bicycle pedal cover of Patent Document 2 does nothing but cover the entire surrounding of a pedal with a soft material having elasticity, the problem is that the tread force receiving surface of a pedal is deformed when used so that power for stepping on a bicycle pedal dissipates and the driving force is lost.

Furthermore, as a technology for strengthening the non-slipping effect of the deck surface, pedal provided with a stud pin on the deck surface has been known. Here, a stud pin is formed by screwing a bolt to a female threaded part provided on the main body. In this case, a spacer for adjusting a height can be assembled and fixed to the main body of a pedal using a stud pin. As a similar technology, a non-slipping device for a bicycle pedal has been known in which a protrusion is formed on the surface of the main body of a pedal (see, e.g., Patent Document 3). In such a pedal provided with a stud pin on the deck surface, the non-slipping effect is higher when the height of a protrusion from the deck surface of a stud pin is greater; in some mountain bikes meant for off road running, the height of the protrusion of a pin exceeds 5 mm. However, although a stud pin can achieve some non-slipping effect, the problem is that it may cause damage to the sole of a shoe or to a leg of a user when he/she takes a misstep from the pedal.

Technical Document of Prior Art

Patent Documents

Patent Document 1 Japanese Patent Application Kokai Publication No. 2010-162964

Patent Document 2 Japanese Utility Model Application Publication No. S57-133488

Patent Document 3 Japanese Utility Model Application Publication No. S59-022088

SUMMARY OF THE INVENTION

Problems that the Invention is to Solve

In view of such circumstances, the object of the present invention is to provide a spacer for adjusting the tread of a bicycle pedal, wherein the sole can fit to its tread force receiving surface without causing damage to a user's foot or shoe and the non-slipping effect is high.

Means for Solving the Problems

In order to solve the abovementioned problems, the spacer for adjusting the tread of a bicycle pedal according to the present invention is a spacer detachable from the main body of a bicycle pedal, wherein the spacer comprises an elastic material for adjusting a height from a deck surface, and by adding tread force to the elastic material, a tread force receiving surface is pushed down in the direction of thickness according to the tread force and the tip of a stud pin attached to the main body of the pedal is exposed more from the tread force receiving surface. Since the detachable spacer has sufficient thickness and elasticity and can be deformed to become thin when the tread force receiving surface is pushed down, it can cover and protect a large portion of the exposed part of the stud pin (3a, 3b) when no foot is placed on the pedal, and when a foot is placed on the pedal, a stud pin protrudes to provide the non-slipping effect. As used herein, the term "deck surface" refers to the surface of the main body of a pedal with no spacer attached with which a user brings his/her foot into contact at the time of use. The term "tread force receiving surface" refers to the surface with which a user's foot comes into contact when a spacer is attached to the main body of a pedal, wherein the surface receives the tread force of the user's foot to be moved or deformed vertically.

The elastic material in the spacer for adjusting the tread of a bicycle pedal according to the present invention is preferably any of silicone foam, ethylene-vinyl acetate (EVA) foam, polyurethane foam, polystyrene foam, polyethylene foam, foam rubber, and combinations thereof. The spacer may be integrally formed of the elastic material and a rigid core material.

The spacer for adjusting the tread of a bicycle pedal according to the present invention is constituted of an elastic material and a rigid member, and the elastic material is vertically movable by means of a coiled spring or a plate spring. The spacer can be moved vertically in conjunction with the spring member of a coiled spring or a plate spring, which can be moved vertically, even when the rigid member has no elastic strength; therefore, the tread force receiving surface can be pushed down even when the spacer is made of a spring member and a rigid member. Here, the longitudinal direction of the coiled spring is equal to the thickness direction of the main body of the pedal.

The elastic material in the spacer for adjusting the tread of a bicycle pedal according to the present invention may be divided into the front and rear sides of the main body of the pedal as well as into the up and down sides of the main body of the pedal, i.e., it may be divided into at least four parts.

As a result, spacers can be divided into and placed at four areas relative to the main body of the pedal and its rotating axis.

The elastic material in the spacer for adjusting the tread of a bicycle pedal according to the present invention may be a rigid spring member formed by bending the rigid member and provided with elasticity and is U-shaped sandwiching the main body of the pedal vertically and provided for each of the front and rear sides of the main body of the pedal, wherein the rigid spring member is vertically movable. The use of a rigid spring member makes it possible to realize a spacer that can achieve the non-slipping effect and be fit into the sole using less number of members.

The elastic material in the spacer for adjusting the tread of a bicycle pedal according to the present invention may have a first through-hole passing the stud pin therethrough and a second through-hole passing the clasp therethrough and is attached to the main body of the pedal using the clasp. The numbers of both the first through-hole and the second through-hole may be plural, and the numbers of the stud pin and the clasp may freely be designed according to required strength.

The tread force receiving surface in the spacer for adjusting the tread of a bicycle pedal according to the present invention is pushed up in the direction of thickness to the original exposure position of the tip of a stud pin at a time when the tread force is removed from the elastic member. Thus, the elastic strength that can bring a position of thickness changed by the tread force back to the original position of the tread force receiving surface acts to push up the spacer to the original exposure position of the tip of the stud pin. When a user steps his/her foot on and tread the pedal, the upper side of the elastic material (i.e., the tread force receiving surface) is pushed down to expose a stud pin, so that the non-slipping effect can be enhanced at the time of stepping on, and when the user removes his/her foot from the pedal, the tread force receiving surface is pushed up by the elastic strength of the elastic member to be used safely without causing any damage to the sole or the like.

Effect of the Invention

In the spacer for adjusting the tread of a bicycle pedal according to the present invention, the effect is such that the sole can be fitted to the tread force receiving surface without causing any damage to the foot of a user or a shoe and that when the tread force is applied to the elastic material, the tread force receiving surface is pushed down in the thickness direction according to the tread force. Another effect is such that the non-slipping effect can be enhanced because the tip of a stud pin attached to the main body of the pedal is exposed more from a spacer.

DETAILED DESCRIPTION OF PREFERRED EMBODIMENTS

The following describes one embodiment of the present invention in detail with reference to drawings. The scope of the present invention is not limited to the following working examples or illustrated examples but can be modified or changed in various ways.

Example 1

Figure 1:
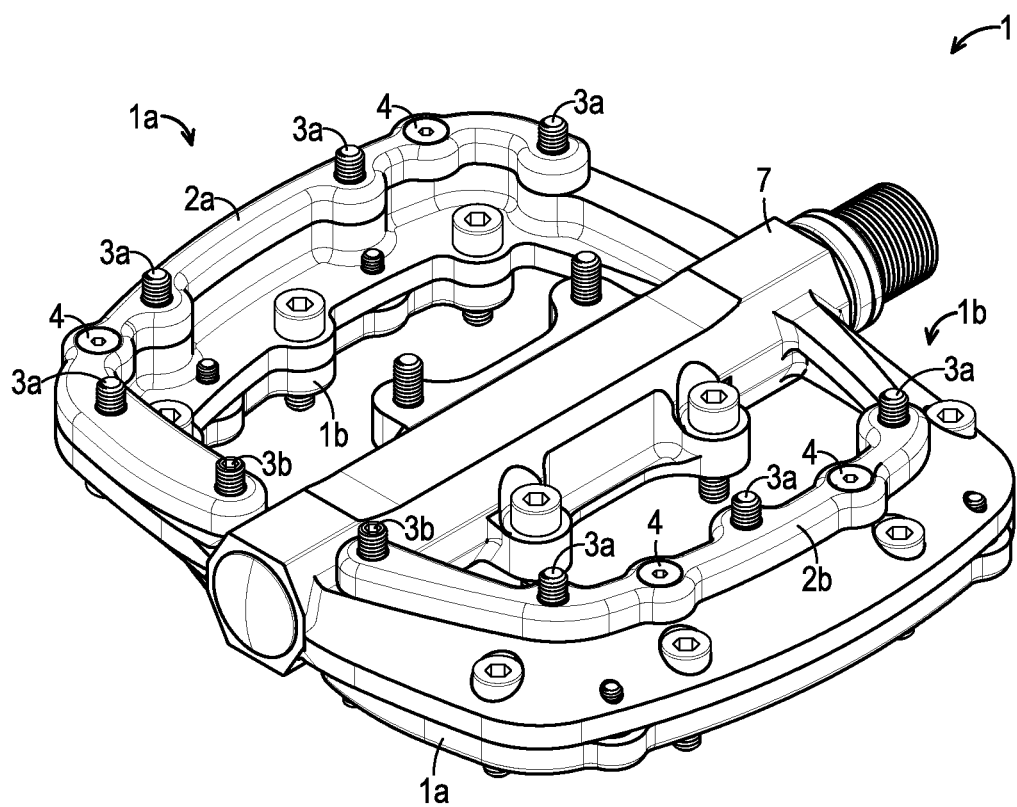
FIG. 1 An outside perspective view of a bicycle pedal according to Example 1.

FIG. 1 shows an outside perspective view of a bicycle pedal according to Example 1. As shown in FIG. 1, the bicycle pedal 1 is constituted of the main body 7 of the pedal, two spacers 1a, and two spacer 1b. In other words, one spacer 1a is provided on the upper front side of the main body 7 of the pedal, and one spacer 1b is provided on the rear side. Moreover, one spacer 1b is provided on the lower front side of the main body 7 of the pedal, and one spacer 1a is provided on the rear side. Accordingly, even when the main body 7 of the pedal is rotated by 180 degrees, the spacer 1a is always provided on the upper front side of the main body 7 of the pedal and the spacer 1b is provided on the rear side. As used herein, the term "upper surface" or "lower surface" is used only for the convenience of explanation, i.e., up or down is not restricted at the time of use. The spacer 1a is made of an elastic material 2a, a stud pin (3a, 3b), and a clasp 4. The spacer 1b is made of an elastic material 2b, a stud pin (3a, 3b), and a clasp 4. The elastic material (2a, 2b) to be used is a material excellent at weather resistance, abrasion resistance, and shock resistance; although silicone foam is used in the present example, it may also be foamed rubber, EVA foam, or the like. The stud pin 3a is a male screw with a head part, and the stud pin 3b is a male screw with no head part. The stud pin (3a, 3b) can enhance the non-slipping effect of the deck surface 7b (see FIG. 2) or tread force receiving surface and, therefore, can be used even for driving a bicycle on the rough road.

Figure 2:
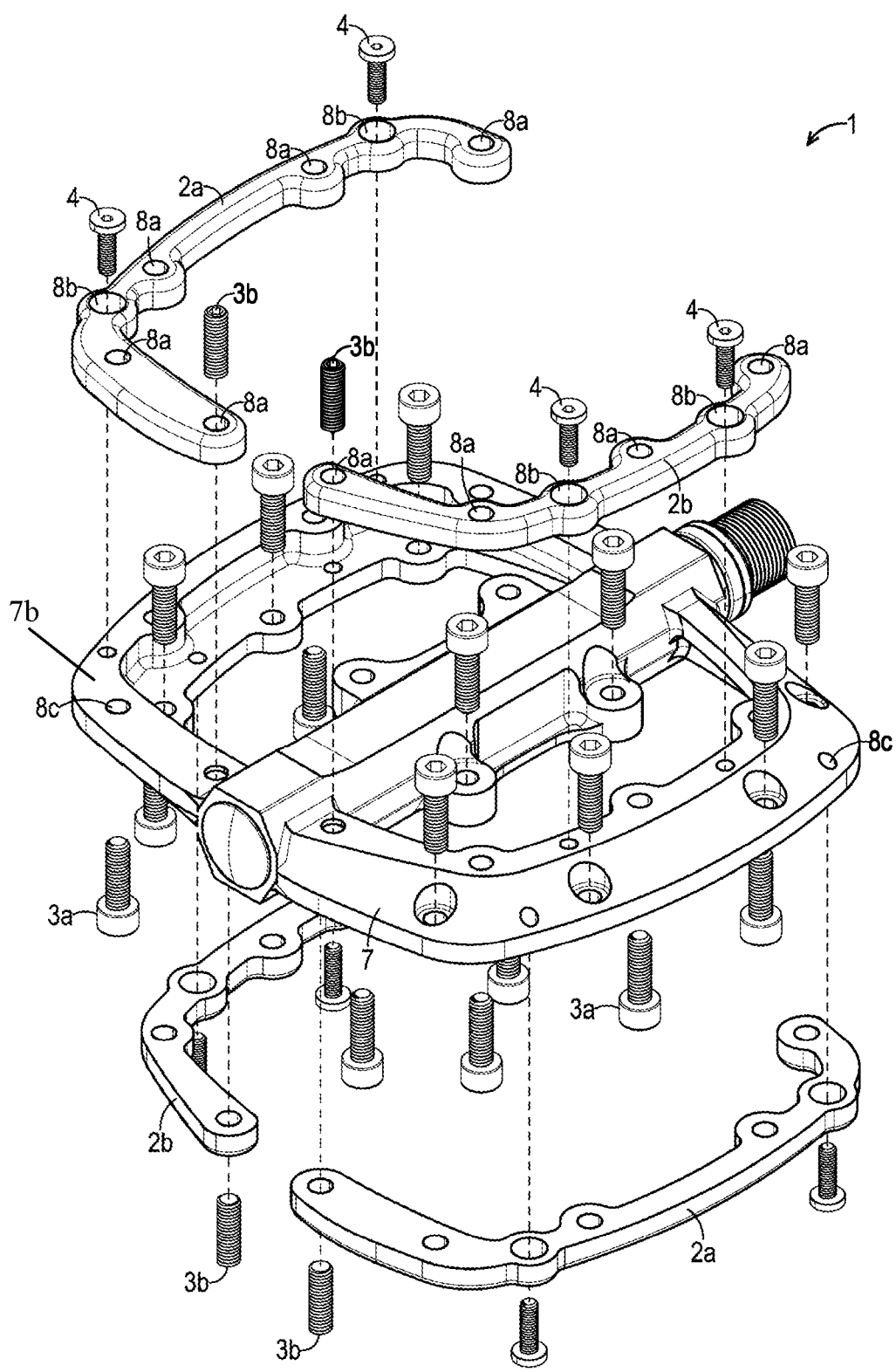
FIG. 2 An explanatory view of a bicycle pedal according to Example 1.

FIG. 2 shows an explanatory view of a bicycle pedal according to Example 1. As shown in FIG. 2, the elastic material 2a is provided with five through-holes 8a and two through-holes 8b. The elastic material 2b is provided with four through-holes 8a and two through-holes 8b. On the upper surface side of the main body 7 of the pedal are provided female threaded parts 8c whose number corresponds to the number of through-holes (8a, 8b). When the elastic material 2a is attached to the main body 7 of the pedal, it is screwed into the female threaded part 8c after the clasp 4 is passed through the through-hole 8b. The stud pin 3b is attached from the upper surface side of the main body 7 of the pedal; it is passed through the through-hole 8a and then screwed into the female threaded part 8c. The stud pin 3a is attached from the lower surface side of the main body 7 of the pedal; it is screwed into the female threaded part 8c and then passed through the through-hole 8a. The elastic material 2b is attached to the main body 7 of the pedal in a manner similar to that of the elastic material 2a. The spacer (1a, 1b) to be provided on the lower surface side of the main body 7 of the pedal is also attached in a similar matter. Thus, the spacer (1a, 1b) has such a structure that it can be detached and replaced relatively with ease using generally available tools.

Figure 3:
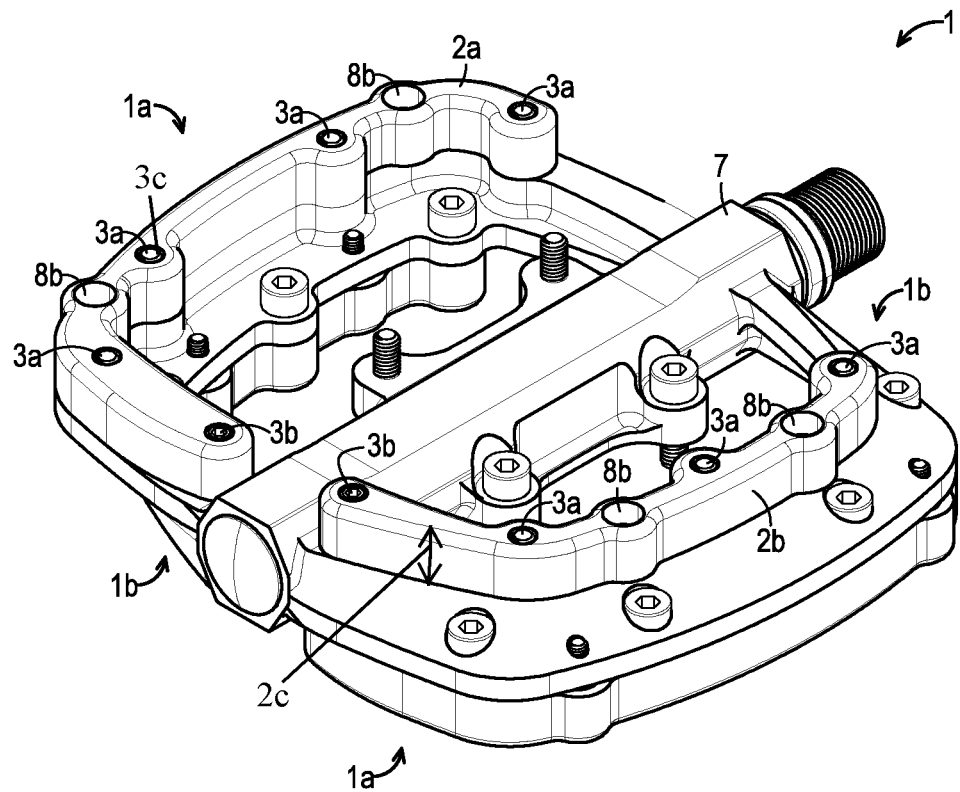
FIG. 3 An image diagram of a spacer before stepping thereon.
Figure 4:
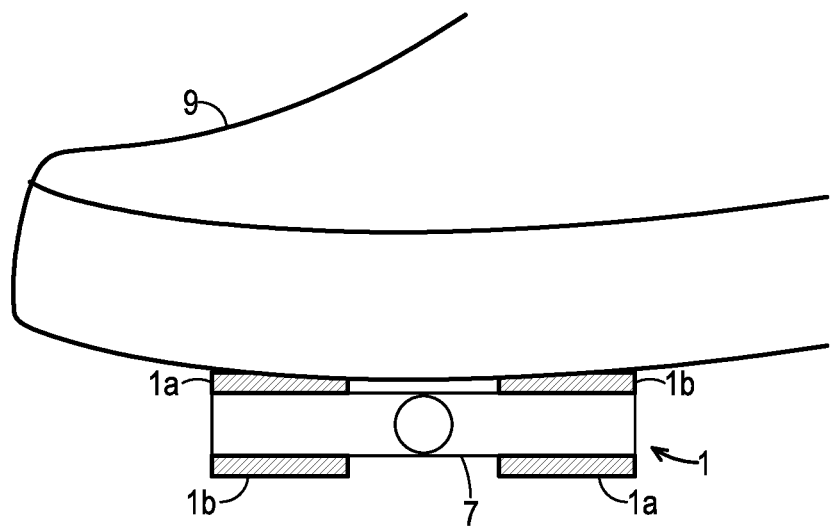
FIG. 4 An explanatory view of the bicycle spacer according to Example 1 (1).

FIG. 3 shows an image diagram of a spacer before stepping thereon. As shown in FIG. 3, in the spacer (1a, 1b), the clasp 4 is passed through the through-hole 8b of the elastic material (2a, 2b) and then screwed deeply into the female threaded part 8c and, therefore, is not exposed from the elastic material (2a, 2b). On the other hand, the tip 3c of the stud pin (3a, 3b) is slightly exposed from the elastic material (2a, 2b). However, since the elastic material (2a, 2b) has a height 2c approximately equal to that of stud pin (3a, 3b), the elastic material (2a, 2b) can cover and protect a large portion of the exposed part of the stud pin (3a, 3b) when no foot is placed on the main body 7 of the pedal, i.e., the structure is such that problems of causing damage to the sole of a shoe or to a leg of a user when he/she takes a misstep from the pedal can hardly occur.

Figure 5:
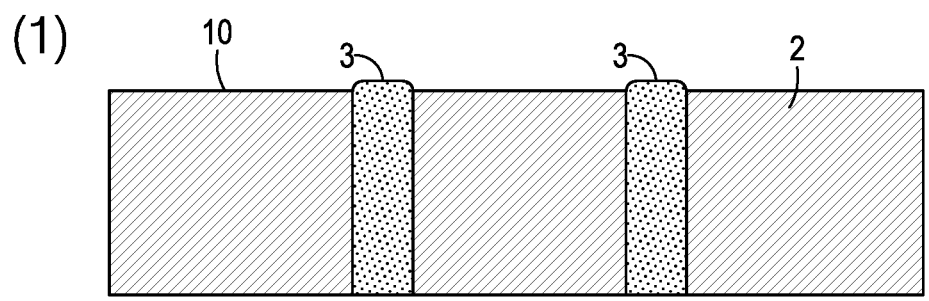
FIG. 5 An explanatory view of the bicycle spacer according to Example 1 (2).
Figure 5:
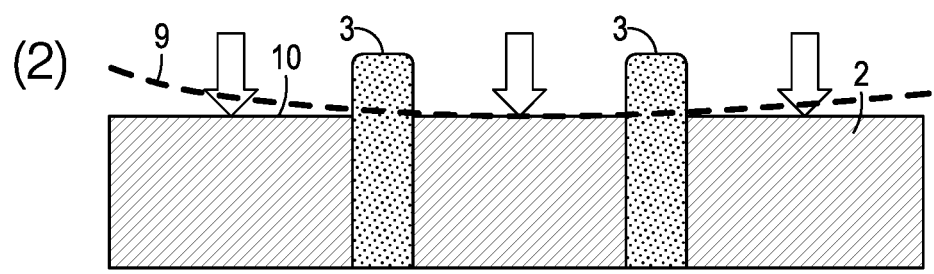

FIG. 5 is an explanatory view of the bicycle spacer according to Example 1, showing image diagrams of the spacer, wherein (1) shows the state before stepping on and (2) shows the state at the time of stepping on. As shown in FIG. 5 (1), when a user has not placed his/her foot on the surface of the elastic material 2 yet, a large portion of the exposed part of the stud pin 3 is covered by the elastic material 2. On the other hand, as shown in FIG. 5 (2), when a user places his/her foot on the surface of the elastic material 2 or further steps on the pedal, the sole of the shoe 9 pushes down the tread force receiving surface 10 to substantially expose the tip of the stud pin 3. Accordingly, when the user pushes the pedal, the stud pin 3 enhances the non-slipping effect as a matter of fact. When the user removes his/her foot from the pedal, the exposed part of the stud pin 3 is covered, so that the pedal can safely be used without causing any damage to the sole or the like, as shown in FIG. 5 (1).

Figure 6:
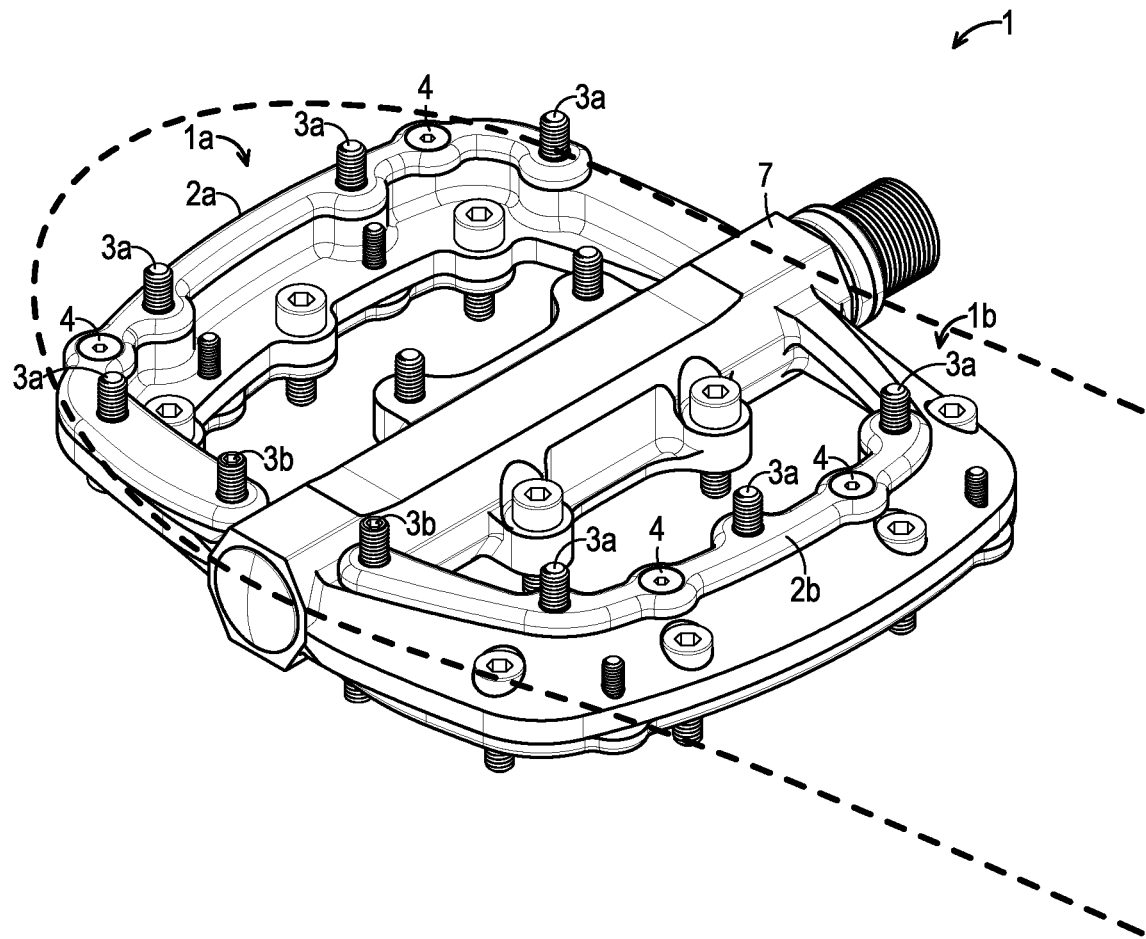
FIG. 6 An image diagram of a spacer after stepping thereon.

FIG. 6 shows an image diagram of a spacer after stepping thereon. As shown in FIG. 6, when the user places his/her foot on the bicycle pedal 1 and steps on the pedal, the sole of shoe 9 pushes down the elastic material (2a, 2b) as described above, so that the tip of the stud pin (3a, 3b) is exposed more. When the user removes his/her foot from the pedal, the exposed part of the stud pin (3a, 3b) is covered, so that the pedal can safely be used without causing any damage to the sole or the like, as shown in FIG. 3.

Example 2

Figure 7:
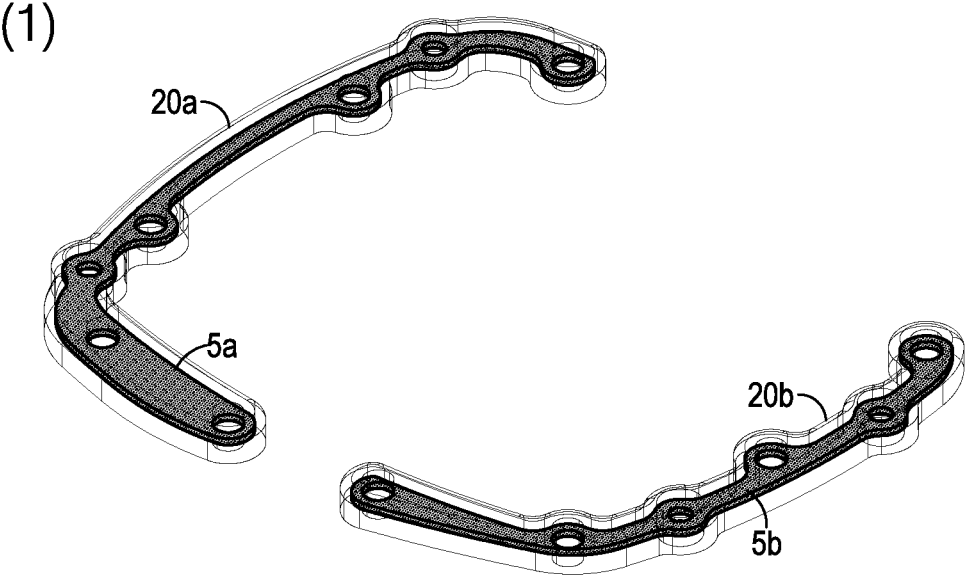
FIG. 7 An explanatory view of a spacer according to Example 2.
Figure 7:
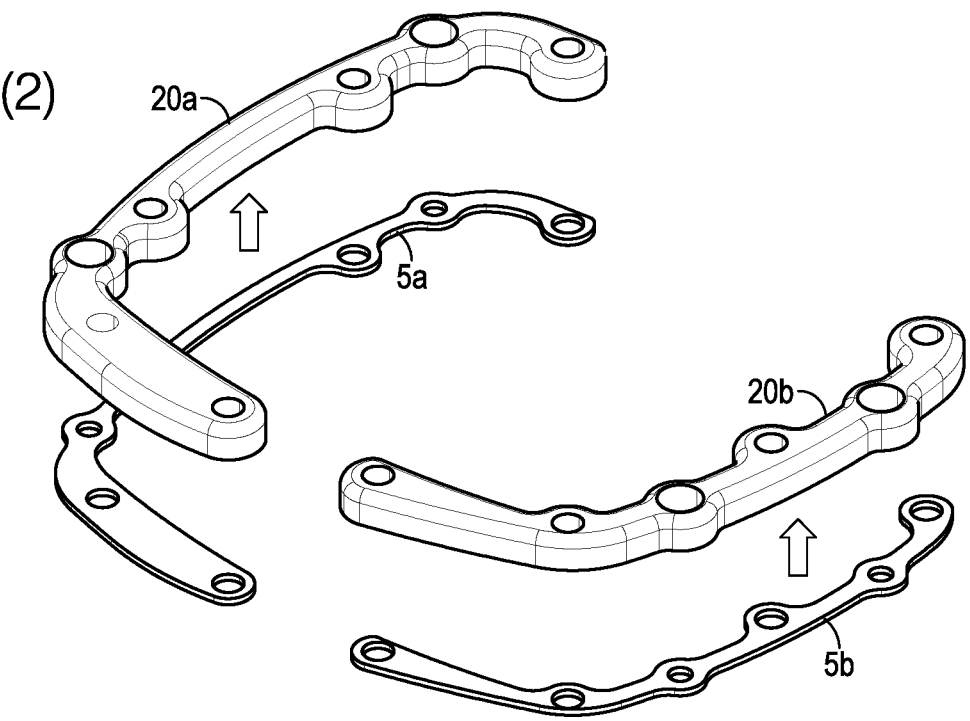

FIG. 7 is an explanatory view of a spacer according to Example 2, wherein (1) is an image diagram of attached core materials and (2) is an exploded image diagram. As shown in FIG. 7 (1), a core material (5a, 5b) made of a metal is buried in an elastic material (20a, 20b) constituting the spacer of Example 2. The elastic material (20a, 20b) is formed of silicone foam like the spacer of Example 1; however, since the core material (5a, 5b) made of a metal is buried, great assembly strength can be provided within the range of not inhibiting any change in the thickness direction. Although not shown here, the bottom part of the elastic material (20a, 20b) is provided with a recess for burying the core material (5a, 5b); as shown in FIG. 7 (2), the core material (5a, 5b) is attached by inserting it into the recess from the bottom part of the elastic material (20a, 20b). As an alternative method, the elastic material (20a, 20b) and the core material (5a, 5b) may integrally be molded, for example.

Example 3

Figure 8:
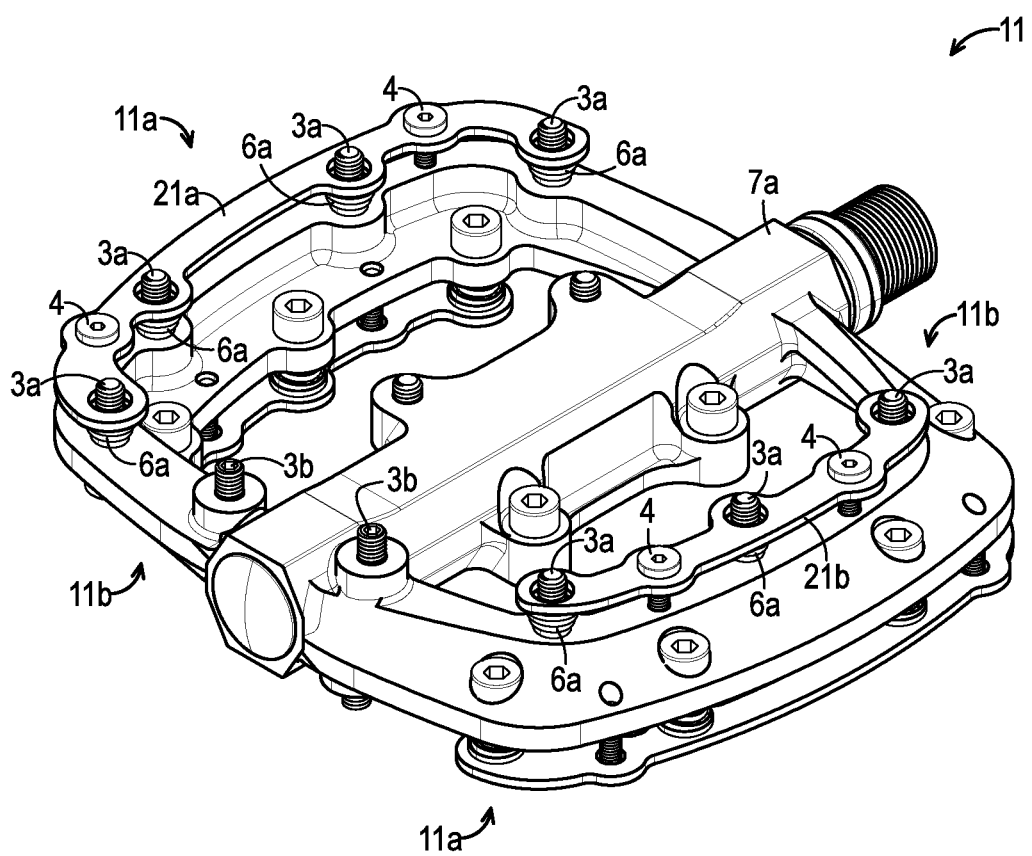
FIG. 8 An outside perspective view of a bicycle pedal according to Example 3.

FIG. 8 shows an outside perspective view of a bicycle pedal according to Example 3. As shown in FIG. 8, the bicycle pedal 11 of Example 3 is constituted of the main body 7a of the pedal, two spacers 11a, and two spacer 11b. In other words, one spacer 11a is provided on the upper front side of the main body 7a of the pedal, and one spacer 11b is provided on the rear side. Moreover, one spacer 11b is provided on the lower front side of the main body 7a of the pedal, and one spacer 11a is provided on the rear side. Accordingly, even when the main body 7a of the pedal is rotated by 180 degrees, the spacer 11a is always provided on the upper front side of the main body 7a of the pedal and the spacer 1 lb is provided on the rear side. The spacer 11a is made of a rigid member 21a, a stud pin (3a, 3b), a clasp 4, and a coiled spring 6a. The spacer 11b is made of a rigid member 21b, a stud pin (3a, 3b), a clasp 4, and a coiled spring 6a. The rigid member (21a, 21b) is made of a rigid metal and, therefore, its elastic strength is low; however, since the coiled spring 6a is provided, the rigid member (21a, 21b) can be moved vertically in response to a load from above.

Figure 9:
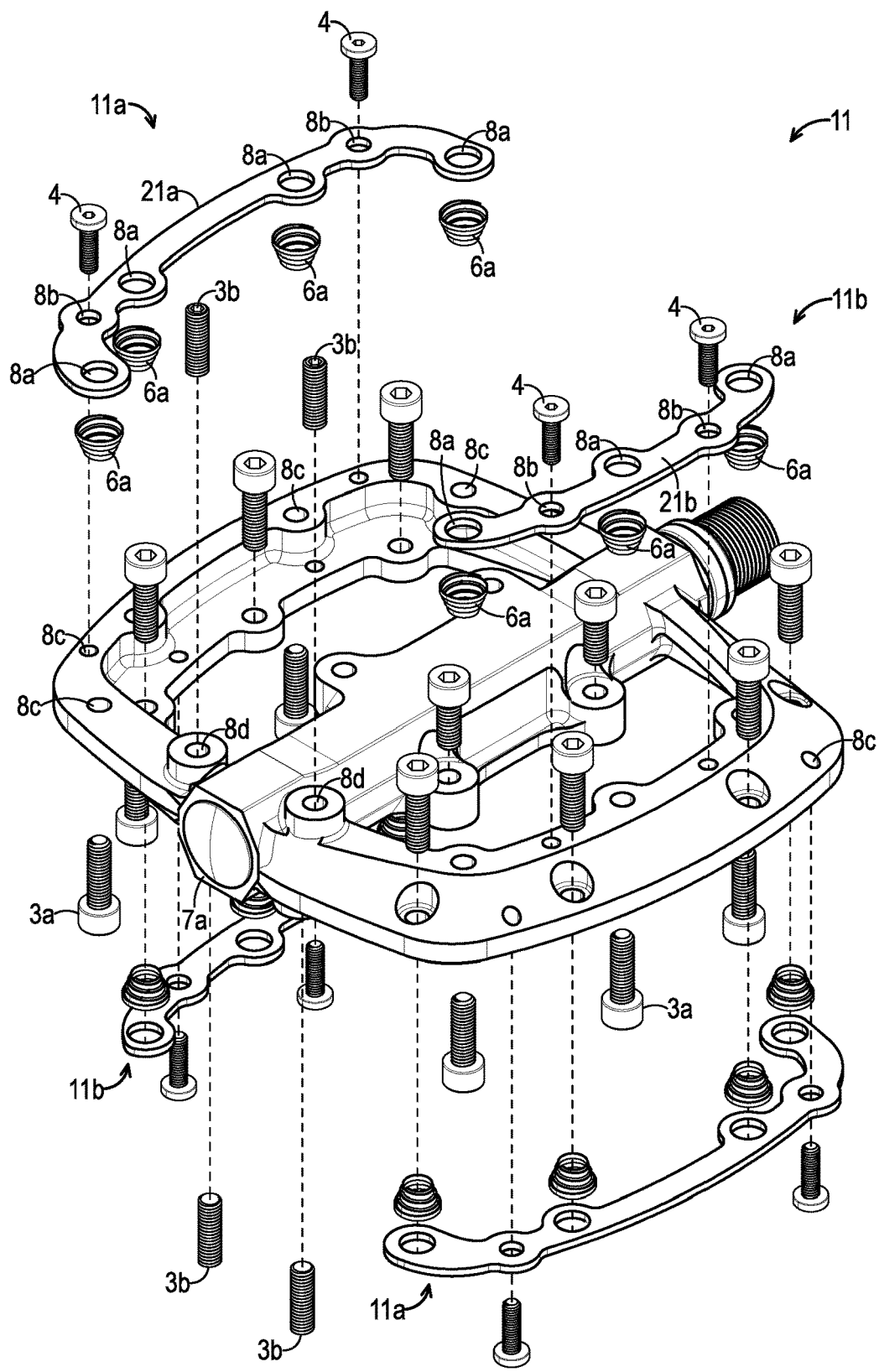
FIG. 9 An exploded image diagram of a bicycle pedal according to Example 3.

FIG. 9 shows an exploded image diagram of a bicycle pedal according to Example 3. As shown in FIG. 9, the rigid member 21a is provided with four through-holes 8a and two through-holes 8b. The rigid member 21b is provided with three through-holes 8a and two through-holes 8b. Four coiled spring 6a are arranged in between the rigid member 21b and the main body 7a of the pedal. On the upper surface side of the main body 7a of the pedal are provided female threaded parts 8c whose number corresponds to the number of through-holes (8a, 8b). In addition to the female threaded parts 8c, one female threaded part 8d is provided on each of the front and rear sides of the main part 7a of the pedal.

At the time of attaching the rigid member 21a to the main body 7a of the pedal, the stud pin 3a is first attached. The stud pin 3a is screwed into the female threaded part 8c from the lower surface side of the main body 7a of the pedal and then passed through the coiled spring 6a and then the through-hole 8a. Subsequently, the clasp 4 is passed through the through-hole 8b from the upper surface side of the main body 7a of the pedal and then screwed into the female threaded part 8c. The rigid member 21b is also attached to the main body 7a of the pedal in a manner similar to that of the rigid member 21a. The stud pin 3b is attached by screwing it into the female threaded part 8d. The spacer (11a, 11b) to be provided on the lower surface side of the main body 7a of the pedal is also attached in a similar matter.

In the bicycle pedal 11 of Example 3, when a user places his/her foot thereon and steps on it, the rigid member (21a, 21b) is pushed down to expose the stud pin 3a. As a result, the non-slipping effect is enhanced at the time of stepping on, and when the tread force is reduced or the user removes his/her foot from the pedal, the rigid member (21a, 21b) is pushed up by the elastic strength of the coiled spring 6a, so that the pedal can be used safely without causing any damage to the sole or the like. Also, the tip of the stud pin 3b is exposed regardless of the vertical movement of the rigid member (21a, 21b). This can work to prevent the user's foot from sliding off the pedal.

Example 4

Figure 10:
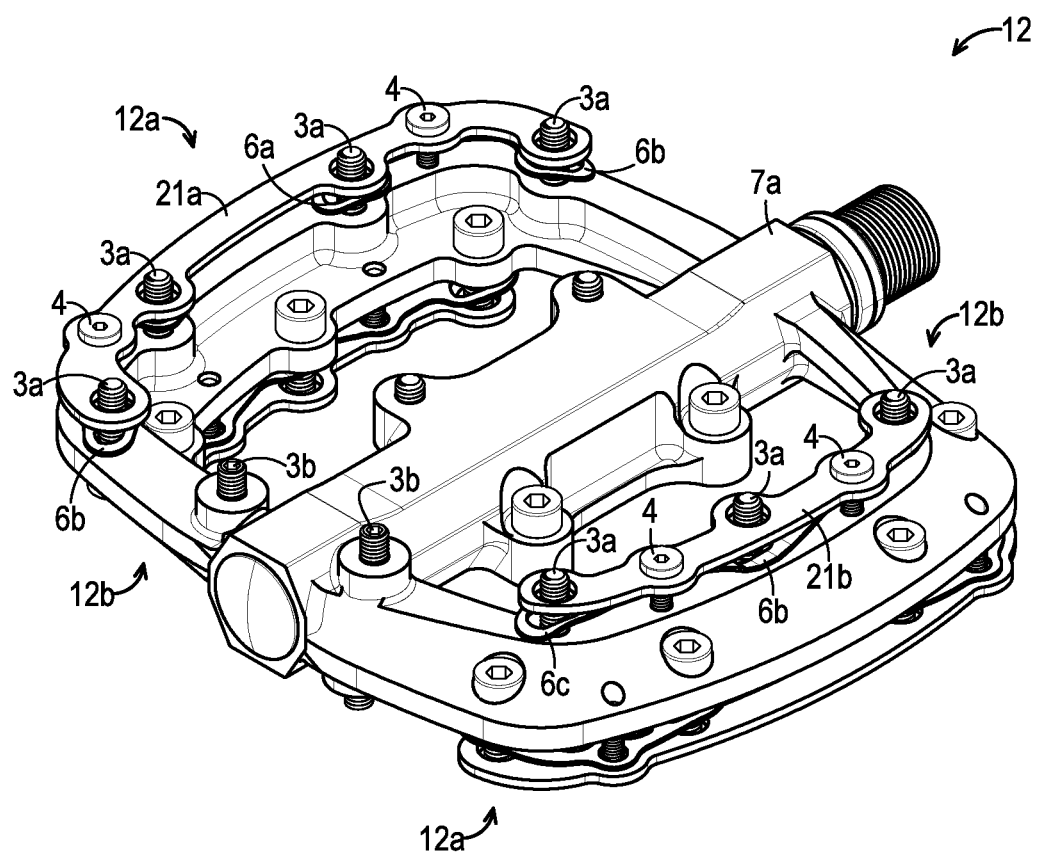
FIG. 10 An outside perspective view of a bicycle pedal according to Example 4.

FIG. 10 shows an outside perspective view of a bicycle pedal according to Example 4. As shown in FIG. 10, the bicycle pedal 12 of Example 4 is constituted of the main body 7a of the pedal, two spacers 12a, and two spacer 12b. In other words, one spacer 12a is provided on the upper front side of the main body 7a of the pedal, and one spacer 12b is provided on the rear side. Moreover, one spacer 12b is provided on the lower front side of the main body 7a of the pedal, and one spacer 21a is provided on the rear side. Accordingly, even when the main body 7a of the pedal is rotated by 180 degrees, the spacer 12a is always provided on the upper front side of the main body 7a of the pedal and the spacer 12b is provided on the rear side.

The spacer 12a is made of a rigid member 21a, a stud pin (3a, 3b), a clasp 4, and a plate spring 6b. The spacer 11b is made of a rigid member 21b, a stud pin (3a, 3b), a clasp 4, and a plate spring (6b, 6c). The rigid member (21a, 21b) is made of a rigid metal and, therefore, its elastic strength is low; however, since the plate spring 6b is provided, the rigid member (21a, 21b) can be moved vertically in response to a load from above.

Figure 11:
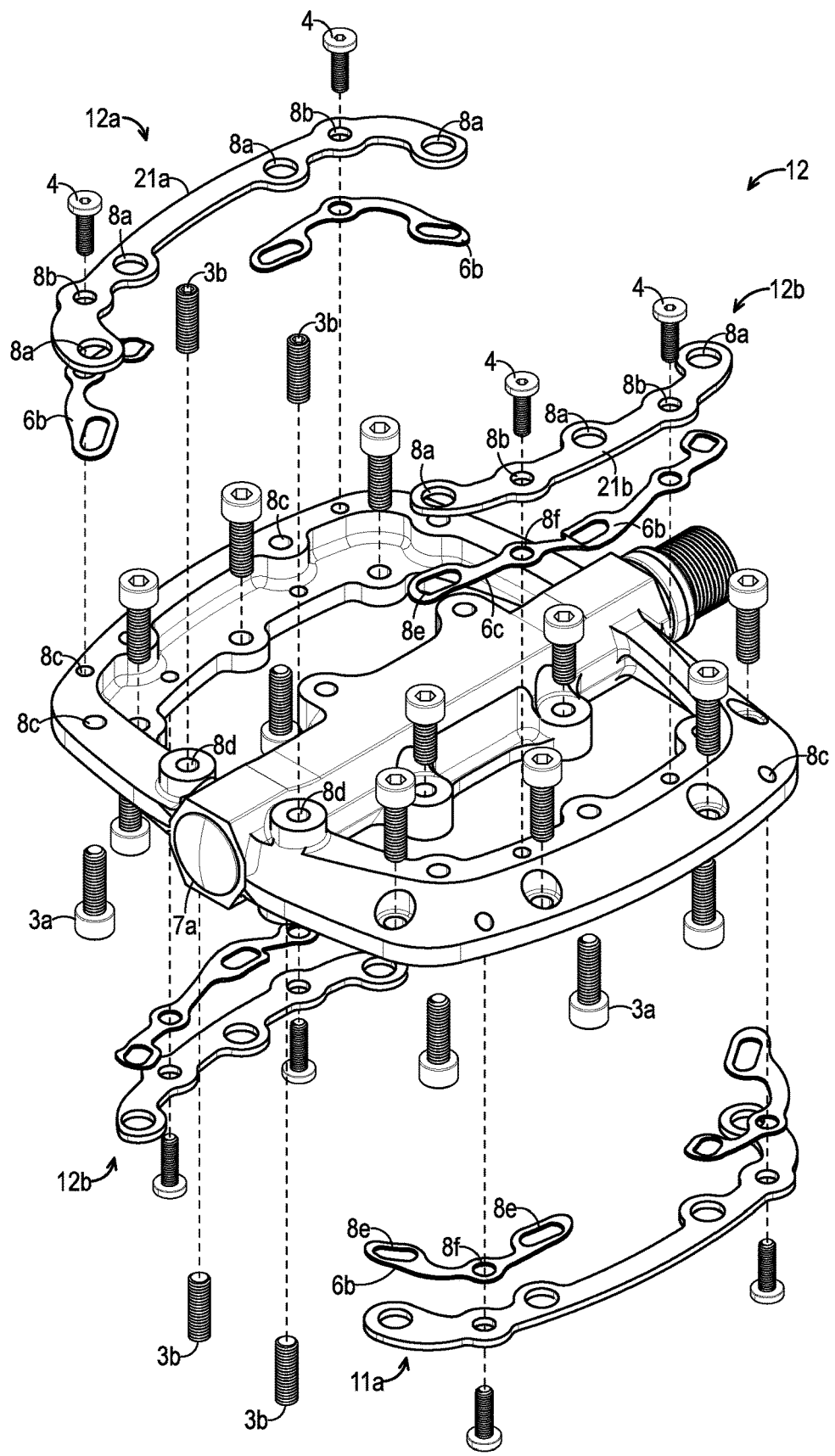
FIG. 11 An exploded image diagram of a bicycle pedal according to Example 4.

FIG. 11 shows an exploded image diagram of a bicycle pedal according to Example 4. As shown in FIG. 11, the rigid member 21a is provided with four through-holes 8a and two through-holes 8b. The rigid member 21b is provided with three through-holes 8a and two through-holes 8b. Hence, the structure of rigid member (21a, 21b) is the same as that of Example 3. Two plate spring 6b are arranged in between the rigid member 21a and the main body 7a of the pedal. One plate spring 6b and one plate spring 6c are arranged in between the rigid member 21b and the main body 7a of the pedal. The plate spring 6b is provided with two through-holes 8e and one through-holes 8f. On the other hand, the plate spring 6c is provided with one through-hole 8e and one through-hole 8f. On the upper surface side of the main body 7a of the pedal are provided female threaded parts 8c whose number corresponds to the number of through-holes (8a, 8b). In addition to the female threaded parts 8c, one female threaded part 8d is provided on the outer side and each of the front and rear sides of the main part 7a of the pedal. The lower surface side of the main part 7a of the pedal has a similar structure.

At the time of attaching the rigid member 21a to the main body 7a of the pedal, the stud pin 3a is first attached. The stud pin 3a is screwed into the female threaded part 8c from the lower surface side of the main body 7a of the pedal and then passed through the through-hole 8e of the plate spring 6b and then the through-hole 8a. Subsequently, the clasp 4 is passed through the through-hole 8b and the through-hole 8f of the plate spring 6b from the upper surface side of the main body 7a of the pedal and then screwed into the female threaded part 8c. The rigid member 21b is also attached to the main body 7a of the pedal in a manner similar to that of the rigid member 21a. The stud pin 3b is attached by screwing it into the female threaded part 8d. The spacer (12a, 12b) to be provided on the lower surface side of the main body 7a of the pedal is also attached in a similar matter.

In the bicycle pedal 12 of Example 4, when a user places his/her foot thereon and steps on it, the rigid member (21a, 21b) is pushed down to expose the stud pin 3a. As a result, the non-slipping effect is enhanced at the time of stepping on, and when the tread force is reduced or the user removes his/her foot from the pedal, the rigid member (21a, 21b) is pushed up by the elastic strength of the plate spring 6b, so that the pedal can be used safely without causing any damage to the sole or the like. Also, the tip of the stud pin 3b is exposed regardless of the vertical movement of the rigid member (21a, 21b). This can work to prevent the user's foot from sliding off the pedal.

Example 5

Figure 12:
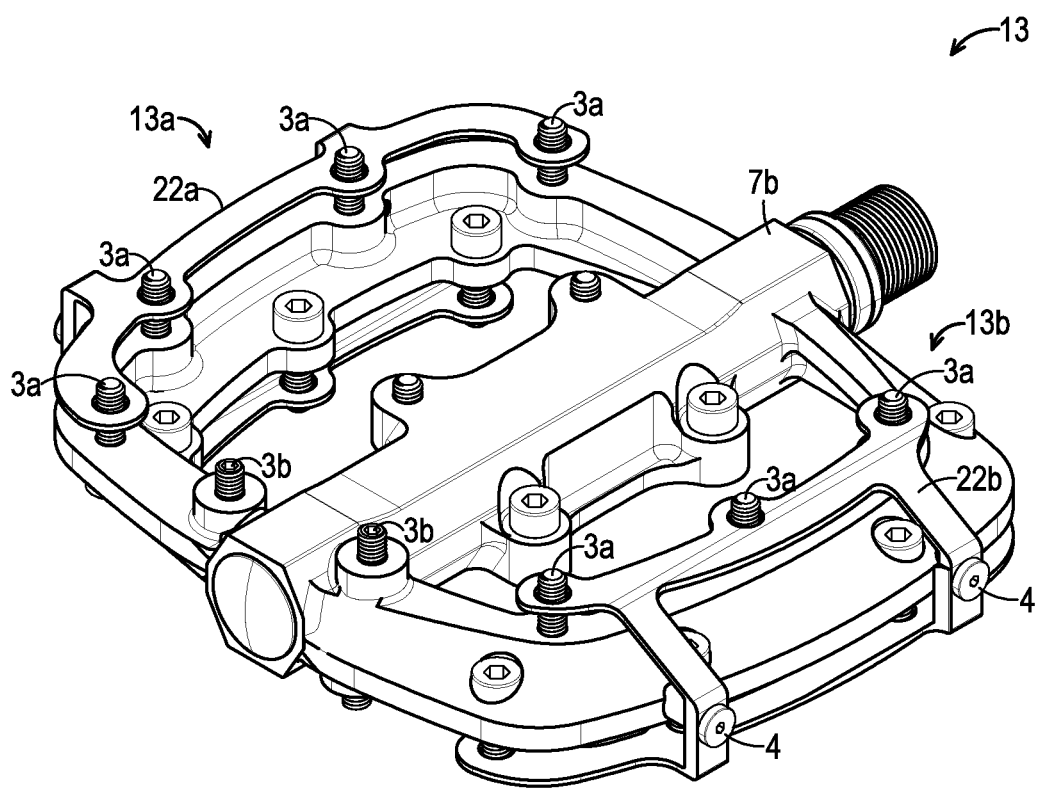
FIG. 12 An outside perspective view of a bicycle pedal according to Example 5.

FIG. 12 shows an outside perspective view of a bicycle pedal according to Example 5. As shown in FIG. 12, the bicycle pedal 13 of Example 5 is constituted of the main body 7b of the pedal and a U-shaped spacer (13a, 13b). In other words, one spacer 13a is provided in such a way as to vertically sandwiching the front part of the main body 7b of the pedal, and the other spacer 13b is provided in such a way as to vertically sandwiching the rear part of the main body 7b of the pedal. The spacer 13a and the spacer 13b have identical structures, and in FIG. 12, the spacer 13b is at a position found by rotating the spacer 13a by 180 degrees in the rotation direction of the pedal and attaching it to the main body 7b of the pedal. The spacer 13a is constituted of a rigid spring member 22a, a stud pin (3a, 3b), and a clasp 4. The spacer 13b is constituted of a rigid spring member 22b, a stud pin (3a, 3b), and a clasp 4. The rigid spring member (22a, 22b) are made of a rigid metal and has a U-shape formed in such a way as to vertically sandwiching the front or rear side of the main body 7 of the pedal, wherein the upper surface side of the rigid spring member (22a, 22b) can be moved vertically in accordance with a load applied from above. In other words, the rigid spring member (22a, 22b) has a structure of playing a role of a plate spring.

Figure 13:
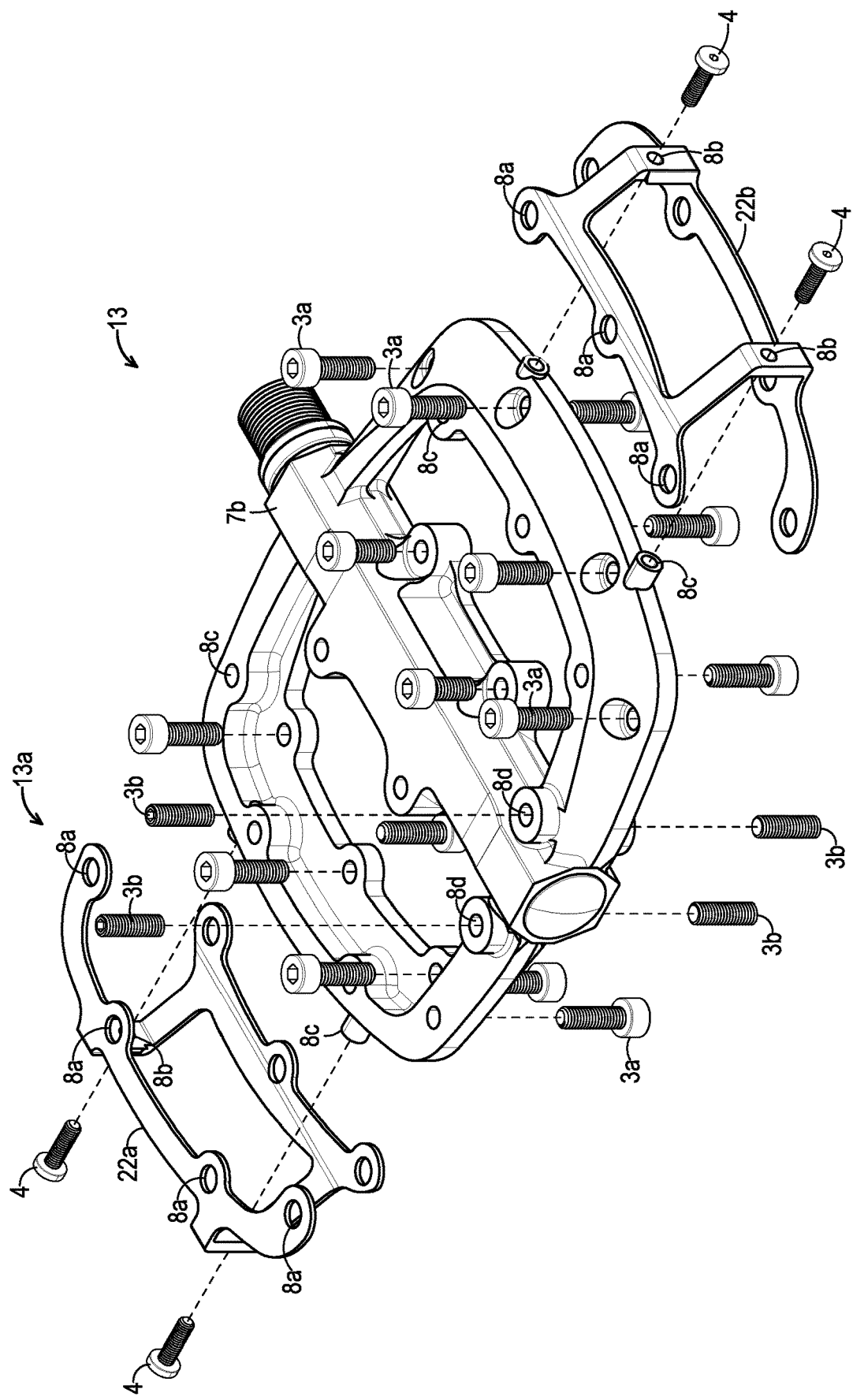
FIG. 13 An exploded image diagram of a bicycle pedal according to Example 5.

FIG. 13 shows an exploded image diagram of a bicycle pedal according to Example 5. As shown in FIG. 13, the rigid spring member 22a is provided with four through-holes 8a on the upper surface side of the pedal 7b and three through-holes 8a on the lower surface side of the pedal 7b. On the lateral side of the rigid spring member 22a are provided two through-holes 8b used for passing the clasp 4 therethrough. The rigid spring member 22a and the rigid spring member 22b have identical structures, and the rigid spring member 22b is at a position found by rotating the rigid spring member 22a by 180 degrees in the rotation direction of the pedal and attaching it to the rear side of the main body 7b of the pedal. Accordingly, the rigid spring member 22b is provided with three through-holes 8a on the upper surface side of the pedal 7b and four through-holes 8a on the lower surface side of the pedal 7b. On the lateral side of the rigid spring member 22b are also provided two through-holes 8b used for passing the clasp 4 therethrough.

On the upper surface side of the main body 7b of the pedal are provided female threaded parts whose number corresponds to the number of the through-holes 8a. This is also true for the lower surface side of the main body 7b of the pedal. On the lateral side of the main body 7b of the pedal are provided female threaded parts 8c whose number corresponds to the number of through-holes 8b. Furthermore, on the upper outer side of the main body 7b of the pedal is provided one female threaded part 8d on each of the front and rear sides thereof. The same is true for the lower surface side of the main body 7b of the pedal.

At the time of attaching the rigid spring member 22a to the main body 7b of the pedal, the rigid spring member 22a is first fixed to the main body 7b of the pedal using the clasp 4. Specifically, the clasp 4 is passed through the through-hole 8b provided on the rigid spring member 22a and then screwed into the female threaded part 8c. Subsequently, the stud pin 3a is attached. The stud pin 3a is screwed into the female threaded part 8c and then passed through the through-hole 8a provided on the rigid spring member 22a. The rigid spring member 22b is also attached to the main body 7b of the pedal in a manner similar to that of the rigid spring member 22a. The stud pin 3b is attached by screwing it into the female threaded part 8d.

In the bicycle pedal 13 of Example 5, when a user places his/her foot thereon and steps on it, the upper surface side of the rigid spring member (22a, 22b) is pushed down, and the tip of the stud pin 3a is further exposed. As a result, the non-slipping effect is enhanced at the time of stepping on, and when the tread force is reduced or the user removes his/her foot from the pedal, the upper surface side of the rigid spring member (22a, 22b) is pushed up by the elastic strength of the rigid spring member (22a, 22b), so that the pedal can be used safely without causing any damage to the sole or the like. The clasp 4 plays a role of fixing the main body 7b of the pedal to the rigid spring member (22a, 22b) via the through-hole 8b as well as a role of a support for the rigid spring member (22a, 22b) at the time of use. Also, the tip of the stud pin 3b is exposed regardless of the vertical movement of the rigid spring member (22a, 22b). This can work to prevent the user's foot from sliding off the pedal.

The invention claimed is:

1. A spacer operable to be detached from and attached to a main body of a bicycle pedal, wherein the spacer comprises an elastic material for adjusting a height from a deck surface, and by adding a tread force to the elastic material, a tread force receiving surface is resiliently compressed downward in the direction of thickness according to the tread force and a tip of a stud pin attached to the main body of the pedal is exposed more from the tread force receiving surface, wherein, when the tread force is removed, the elastic material returns to a non-compressed position, exposing less of the stud pin from the tread force receiving surface, wherein the elastic material is any of silicone foam, ethylene-vinyl acetate (EVA) foam, polyurethane foam, polystyrene foam, polyethylene foam, foam rubber, and combinations thereof, wherein the spacer is constituted of the elastic material and a core member, and a coiled spring or a plate spring is operable to vertically move the elastic material.

2. The spacer for adjusting the tread of a bicycle pedal according to claim 1, wherein the spacer is integrally formed of the elastic material and a core material.

3. The spacer for adjusting the tread of a bicycle pedal according to claim 1, wherein the elastic material is divided into the front and rear sides of the main body of the pedal as well as into the up and down sides of the main body of the pedal.

4. The spacer for adjusting the tread of a bicycle pedal according to claim 1, wherein the elastic material is U-shaped sandwiching the main body of the pedal vertically and provided for each of the front and rear sides of the main body of the pedal.

5. The spacer for adjusting the tread of a bicycle pedal according to claim 1, wherein the elastic material has a first through-hole passing the stud pin therethrough and a second through-hole passing a clasp therethrough and is attached to the main body of the pedal using the clasp.

6. A bicycle pedal provided with the spacer according to claim 1.

7. A spacer operable to be detached from and attached to a main body of a bicycle pedal, wherein the spacer is made of an elastic material for adjusting a height from a deck surface, and by adding a tread force to the elastic material, a tread force receiving surface of the spacer is resiliently compressed downward in the direction of thickness according to the tread force and a tip of a stud pin attached to the main body of the pedal is exposed more from the tread force receiving surface, wherein, when the tread force is removed, the elastic material returns to a non-compressed position, exposing less of the stud pin from the tread force receiving surface, wherein the spacer is constituted of the elastic material and a core material, and a coiled spring or a plate spring is operable to vertically move the elastic material.

8. The spacer for adjusting the tread of a bicycle pedal according to claim 7, wherein the spacer is integrally formed of the elastic material and the core material.

9. The spacer for adjusting the tread of a bicycle pedal according to claim 7, wherein the elastic material is divided into the front and rear sides of the main body of the pedal as well as into the up and down sides of the main body of the pedal.

10. A spacer operable to be detached from and attached to a main body of a bicycle pedal, wherein the spacer comprises an elastic material for adjusting a height from a deck surface, and by adding a tread force to the elastic material, a tread force receiving surface is resiliently compressed downward in the direction of thickness according to the tread force and a tip of a stud pin attached to the main body of the pedal is exposed more from the tread force receiving surface, wherein, when the tread force is removed, the elastic material returns to a non-compressed position, exposing less of the stud pin from the tread force receiving surface, wherein:
- the spacer includes two first spacers and two second spacers having different shapes, a first one of the two first spacers disposed on a front upper surface of the main body and a second one of the two first spacers disposed on a rear lower surface of the main body, and a first one of the two second spacers disposed on a rear upper surface of the main body and a second one of the two second spacers disposed on a front upper surface of the main body; and
- the spacer is constituted of the elastic material and a core member, and a coiled spring or a plate spring is operable to vertically move the elastic material.

11. The spacer for adjusting the tread of a bicycle pedal according to claim 10, wherein the elastic material is any of silicone foam, ethylene-vinyl acetate (EVA) foam, polyurethane foam, polystyrene foam, polyethylene foam, foam rubber, and combinations thereof.

12. The spacer for adjusting the tread of a bicycle pedal according to claim 11, wherein the spacer is integrally formed of the elastic material and a core material.

13. The spacer for adjusting the tread of a bicycle pedal according to claim 10, wherein the elastic material is divided into the front and rear sides of the main body of the pedal as well as into the up and down sides of the main body of the pedal.

14. The spacer for adjusting the tread of a bicycle pedal according to claim 10, wherein the elastic material is U-shaped sandwiching the main body of the pedal vertically and provided for each of the front and rear sides of the main body of the pedal.

* * * * *